United States Patent
Kreiner et al.

(10) Patent No.: US 10,235,472 B2
(45) Date of Patent: *Mar. 19, 2019

(54) GUEST BROWSER

(71) Applicant: AT&T Intellectual Property I, L.P., Atlanta, GA (US)

(72) Inventors: Barrett Kreiner, Woodstock, GA (US); Amy Zwarico, Mountain Brook, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/231,312

(22) Filed: Aug. 8, 2016

(65) Prior Publication Data

US 2016/0350438 A1    Dec. 1, 2016

Related U.S. Application Data

(63) Continuation of application No. 14/833,178, filed on Aug. 24, 2015, now Pat. No. 9,411,904, which is a
(Continued)

(51) Int. Cl.
*G06F 17/30* (2006.01)
*H04L 29/06* (2006.01)
(Continued)

(52) U.S. Cl.
CPC ...... *G06F 17/30905* (2013.01); *G06F 17/212* (2013.01); *G06F 17/2247* (2013.01); *G06F 17/30873* (2013.01); *G06F 17/30887* (2013.01); *G06F 17/30896* (2013.01); *G06Q 30/02* (2013.01); *H04L 29/06* (2013.01); *H04L 29/08072* (2013.01); *H04L 29/0899* (2013.01);
(Continued)

(58) Field of Classification Search
None
See application file for complete search history.

(56) References Cited

U.S. PATENT DOCUMENTS 5,926,631 A    7/1999  McGarvey
5,966,540 A   10/1999  Lister et al.
(Continued)

OTHER PUBLICATIONS

"interface." Merriam-Webster Online Dictionary. 2010. Merriam-Webster Online. Jun. 6, 2010 <http://www.merriam-webster.com/dictionary/interface>.
(Continued)

*Primary Examiner* — Angela Nguyen
(74) *Attorney, Agent, or Firm* — Hartman & Citrin LLC

(57) ABSTRACT

One embodiment of a guest browser system, among others, includes a guest browser interface configured to provide an address bar interface for accepting a network address for retrieving a first web page. The guest browser interface is rendered from code of a second web page, where content of the second web page is rendered by an installed web browser. The system further includes a guest browser engine configured to retrieve contents of web pages. The guest browser engine is built from code provided by the second web page and is used to update content of the second web page with content from the first web page. Other systems and methods are also provided.

20 Claims, 9 Drawing Sheets

Related U.S. Application Data continuation of application No. 11/302,642, filed on Dec. 14, 2005, now Pat. No. 9,116,998.

(51) Int. Cl.
*G06Q 30/02* (2012.01)
*H04L 29/08* (2006.01)
*G06F 17/21* (2006.01)
*G06F 17/22* (2006.01)

(52) U.S. Cl.
CPC ........ *H04L 29/08981* (2013.01); *H04L 67/02* (2013.01); *H04L 67/2852* (2013.01)

(56) References Cited

U.S. PATENT DOCUMENTS

| | | |
|---|---|---|
| 6,707,879 B2 | 3/2004 | McClelland et al. |
| 6,918,066 B2 | 7/2005 | Dutta et al. |
| 2002/0033846 A1 | 3/2002 | Balasubramanian et al. |
| 2002/0059425 A1 | 5/2002 | Belfiore et al. |
| 2002/0108050 A1 | 8/2002 | Raley et al. |
| 2003/0177397 A1 | 9/2003 | Samman |
| 2005/0021668 A1* | 1/2005 | Beesley .............. H04L 63/1416 709/217 |
| 2006/0095860 A1 | 5/2006 | Wada et al. |

OTHER PUBLICATIONS

U.S. Office Action dated Nov. 28, 2008 in U.S. Appl. No. 11/302,642.
U.S. Office Action dated Nov. 10, 2009 in U.S. Appl. No. 11/302,642.
U.S. Office Action dated Jun. 25, 2010 in U.S. Appl. No. 11/302,642.
U.S. Office Action dated Dec. 7, 2010 in U.S. Appl. No. 11/302,642.
U.S. Office Action dated Feb. 4, 2014 in U.S. Appl. No. 11/302,642.
U.S. Office Action dated Sep. 8, 2014 in U.S. Appl. No. 11/302,642.
U.S. Notice of Allowance dated Mar. 10, 2015 in U.S. Appl. No. 11/302,642.
U.S. Office Action dated Jan. 29, 2016 in U.S. Appl. No. 14/833,178.
U.S. Notice of Allowance dated Mar. 18, 2016 in U.S. Appl. No. 14/833,178.

* cited by examiner

GUEST BROWSER

CROSS-REFERENCE TO RELATED APPLICATIONS

This application is a continuation of U.S. patent application Ser. No. 14/833,178, filed Aug. 24, 2015, now U.S. Pat. No. 9,411,904, which is a continuation of U.S. patent application Ser. No. 11/302,642, filed Dec. 14, 2005, now U.S. Pat. No. 9,116,998. U.S. Pat. No. 9,411,904 and U.S. Pat. No. 9,116,998 are incorporated herein by reference in their respective entireties.

TECHNICAL FIELD

The present disclosure is generally related to network communications and, more particularly, is related to network browsers.

BACKGROUND

A wide variety of applications and software components are often installed with an operating system of a client device to extend the functionality of a web browser installed on the client device. For example, to prevent pop-up advertisements, a pop-up blocking application may be installed to monitor requests for opening new windows within the browser application. Further, virus protection applications are often installed to prevent communications received from the Internet or other network sources that may infect and potentially harm operation of the client device. Such communications may harm not only a local application, such as a web browser, but also other applications, such as the operating system of the host client device, and also other computers in communication with the client device.

Additional types of applications may also be added to extend the functionality of conventional web browsers. Each of these types of applications may need occasional updating of system files to maintain proper operation. For example, a virus protection application may need updates on virus definitions, and a media player plug-in to a web browser may need to be updated with new codecs corresponding to new media formats.

Plug-in applications allow features to be upgraded using modular components that can selectively replace existing components or add new features to an installed web browser application. In general operation, a web browser receives a request for a particular file and based upon the file extension (e.g., WAV, MP3, etc.), the browser passes it to a plug-in application that has been registered to handle that format with the operating system.

From an organizational perspective, however, an organization (such as that of a corporation) may have a policy on which applications are authorized to be installed on a client device owned by the organization and may also have policies on which network locations and web sites that are authorized to be accessed. Further, the organization may have a policy on the level of security (e.g., level of virus protection, level of encryption utilized, etc.) that is to be maintained on the client devices that access the organization's network and network resources. Therefore, maintenance of organizational polices across each client device is cumbersome.

Thus, a heretofore unaddressed need exists in the industry to address the aforementioned deficiencies and inadequacies.

SUMMARY

Embodiments of the present disclosure provide systems and methods for implementing a guest browser. Briefly described, one embodiment of a guest browser system, among others, includes a guest browser interface configured to provide an address bar interface for accepting a network address for retrieving a first web page. The guest browser interface is rendered from code of a second web page, where content of the second web page is rendered by an installed web browser. The system further includes a guest browser engine configured to retrieve contents of web pages. The guest browser engine is built from code provided by the second web page and is used to update content of the second web page with content from the first web page.

Embodiments of the present disclosure can also be viewed as providing methods for implementing a guest browser. In this regard, one embodiment of such a method, among others, can be broadly summarized by the following steps: displaying a guest browser interface having an address bar for accepting network addresses, the guest browser interface being displayed within an interface of an installed web browser, the guest browser interface built from code provided by a web page currently being rendered by the installed web browser; and updating content of the web page being currently rendered with content retrieved by a guest browser engine supporting the guest browser interface, the guest browser interface retrieving content corresponding to a requested web page at a network address inputted into the address bar.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
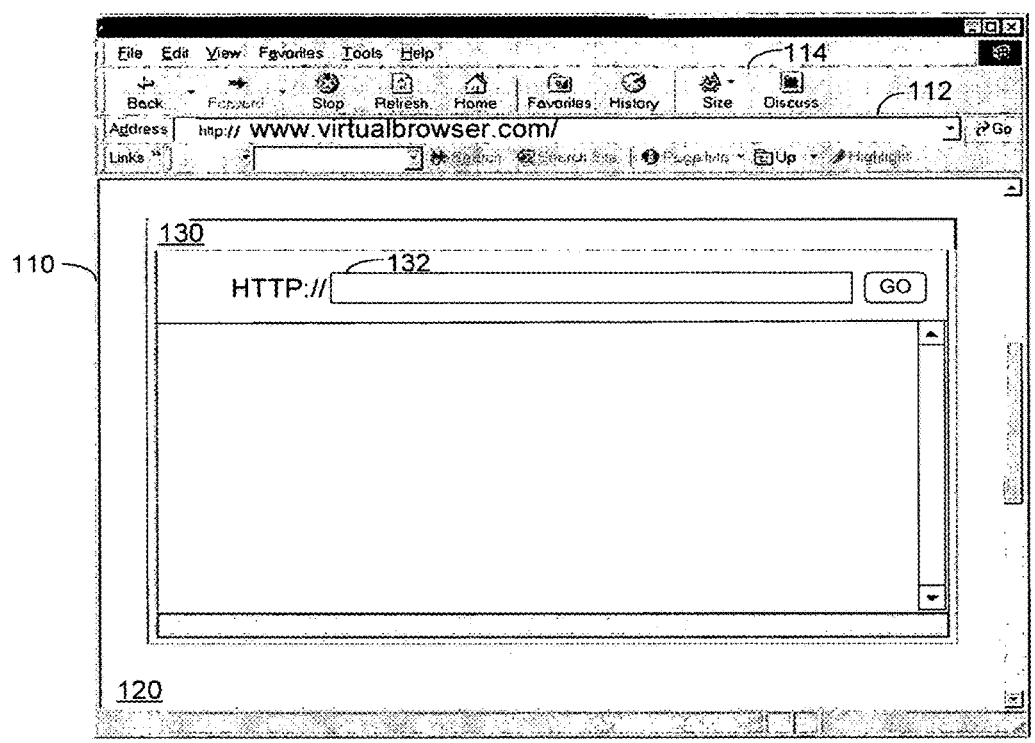
FIG. 1 is a diagram of one embodiment of a graphical interface to a guest browser system of the present disclosure.

FIG. 1 shows one embodiment of a representation of a graphical interface utilized in one embodiment of a guest browser system of the present disclosure. As shown in FIG. 1, a graphical interface 110 to an installed web browser application is displayed. In the figure, the installed web browser interface 110 has its own address bar 112, toolbar buttons 114, and is meant to be representative of a standard web browser application, such as web browsers provided by Microsoft Internet Explorer®, Mozilla Firebird®, Apple Safari®, etc.

Within the web page 120 being currently displayed or rendered by the installed web browser interface 110 of FIG. 1, a guest browser interface 130 is also shown. As shown, the graphical interface 130 also has its own address bar 132 and may also have other interface options, such as toolbar buttons (not shown) and other graphical interface controls. For example, in one embodiment, guest browser logic may maintain a history or log of locations of web page content that has been previously displayed on the guest browser interface so that previous content may be visited by a user via a graphical interface control to provide similar functionality as a "back" button on an installed browser. In addition, functionality offered by the guest browser interface 130 may surpass the functionality of the installed web browser application hosting the guest browser interface 130.

Note, with many installed browser applications on a client device, the browser application consumes documents or media retrieved from a network and renders the document onto a browser display 130. Also, virus protection applications, plug-in modules, extension modules, etc. are installed with an operating system of a client device that executes the installed web browser in order to extend or enhance functionality of the installed web browser.

Referring back to FIG. 1, the address bar 112 of the installed web browser interface 110 displays a network address to a web site ("virtualbrowser.com"). Therefore, in this example, the web page 120 shown in the web browser interface 110 is retrieved from the virtualbrowser.com site. For example, the web page 120 for the virtualbrowser.com site may contain JavaScript or other code that is loaded by an installed browser application to cause the web browser interface 110 to display or render the guest browser interface 130. Further, the web page 120 from the virtual browser.com web site may also cause additional components to be loaded by the installed web browser application, such as virtual pop-up blocking modules, virtual toolbar modules, appropriate virtual virus protection modules—all of which should be up to date because each has just been loaded and should be the newest versions available. In one view, the functionality of the guest browser interface 130 and accompanying functionality is loaded on-demand (e.g., directly when an installed browser application is launched if the virtualbrowser.com is set as a homepage) without any need to install components with the operating system of the client device. As used in this example, the term "virtual" is used to describe a software module that is being used to add a specific feature or service without being installed on a computer system.

Instructions for retrieving the code that is used to build individual modules that are loaded by the installed web browser may be provided in the web page 120 that caused the guest browser module to load. For example, the web page 120 may contain a network site where the module code may be obtained. A copy of the module code may also be stored in a cache for the installed web browser application such that the code may be retrieved from the cache in subsequent launches of the guest browser interface 130. Before doing so, the web page 120 may contain instructions to verify that the version of a module located in a local cache is the same as the version of the module being available at a network location. Therefore, if a newer version is available, the installed web browser application may then download the newest version available.

Figure 2:
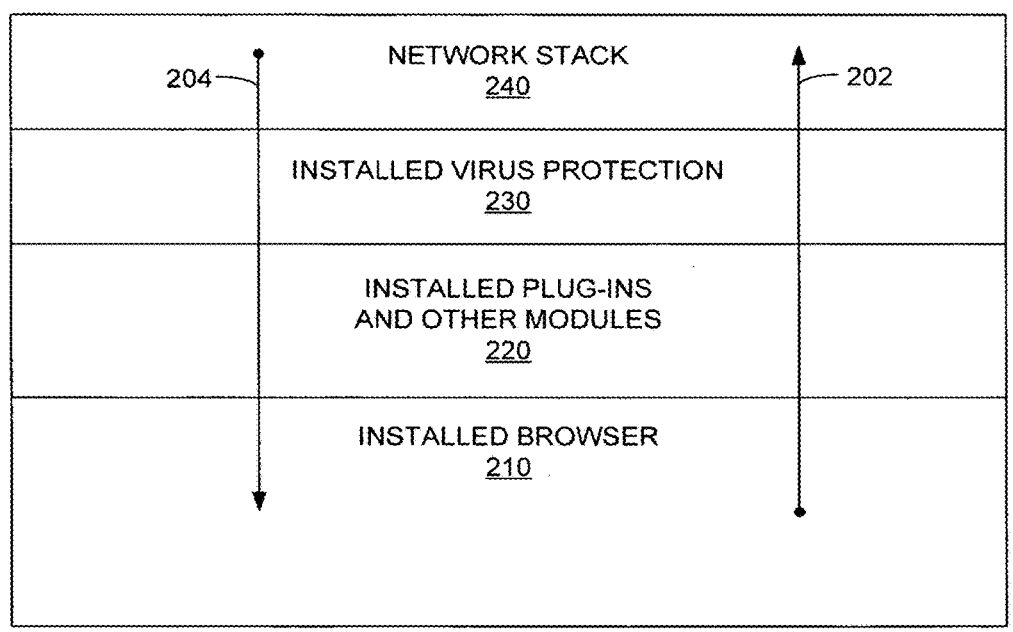
FIG. 2 is a diagram depicting exemplary flows of communications within an installed web browser application utilized within a guest browser system of the present disclosure.

For example, as represented in FIG. 2, in many installed browser applications 210, a web request 202 to a web server is made (in response to a user command) and the request flows 202 from the installed web browser 210, through any installed pop-up blocking applications 220 (and other installed plug-ins, toolbars, or other add-ons), and is scanned by an outbound virus protection software 230 previously installed within the operating system of the client device. After which, the request 202 is presented to the operating system (not represented) and is directed to the network stack 240 of the client device, where the request 202 is sent over a network (not represented).

The virus protection software or application 230 acts as a protective layer between the web browser application 210 and the operating system of the client device and the network stack 240 of the client device to prevent malicious or undesired communications from affecting the client device or other machines located on a network (not represented). The pop-up blocking application 220 and other security measures may also act to prevent undesired information or objects from reaching the operating system of the client device. However, such devices have to be installed to the client machine and continually updated so that they are made aware of new types of communications, codes, data, objects, etc. that are capable of harming client components.

When, the response 204 is received from the network (not represented), the response 204 flows through the same path through the add-on components and back to the installed web browser 210. A web page may then be rendered by the installed web browser application 210.

Next, an embodiment of a guest browser module is described within the context of a guest browser system. Generally, a guest browser module may be viewed as including a graphical interface or a guest browser interface and a guest browser engine. For example, in an embodiment of the guest browser system, a guest browser module performs the functionality of an installed web browser 110 without requiring installation with an operating system, pre-installation of components with the operating system, and may be configured from its creation or instantiation to comply with an organizational policy.

In one embodiment, the guest browser engine is configured to send requests to a web server to retrieve data that is needed at a particular time (e.g., via using SOAP or some other XML-based web services dialect to communicate with a server and using JavaScript to process the web server response). This is done in lieu of retrieving a whole web page of content. Thus, the amount of data interchanged between the guest browser engine of the guest browser module and web server is kept minimal. Web server processing time is also saved, since the guest browser engine performs much of the processing.

Figure 3:
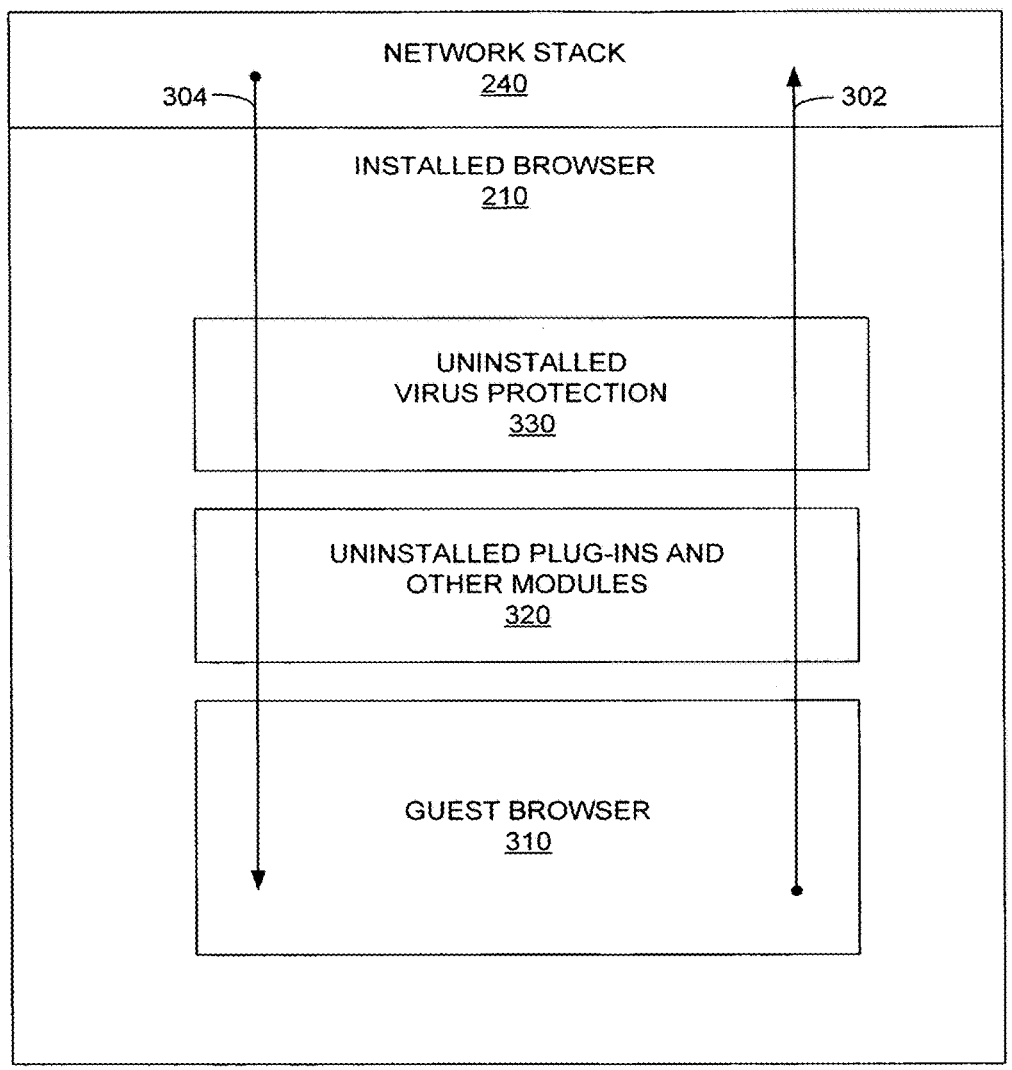
FIG. 3 is a diagram depicting exemplary flows of communications of an embodiment of a guest browser module within a guest browser system of the present disclosure.

Accordingly, FIG. 3 shows communication flows for one embodiment of a guest browser system where the guest browser system includes guest browser module 310. In this representation, an installed web browser application 210 loads uninstalled or "virtual" virus protection 330 and plug-in modules 320 in addition to a guest browser module 310. Therefore, a user of the installed web browser 210 may be presented with a guest browser interface 310. In this example, a web request 302 is initiated from the guest browser module 310 and flows through the virtual plug-in modules 320 and virus protection module 330 before the request 302 is relayed to the installed browser application 210. Then, the installed browser application 210 calls the operating system (not represented) which passes the request to the network stack 240 of the client device hosting these components. The response 304 returns from the network stack 240 and follows a reverse path back to the guest browser module 310. As previously mentioned, no desktop software is installed for the guest browser module 310, virtual virus protection 330, and/or plug-in modules 320. Accordingly, the virtual virus protection 330, plug-ins 320, and guest browser 310 are portable across operating systems and browsers that can support the underlying language construct of the respective components.

For example, in one embodiment, a guest browser module 310 is instantiated using JavaScript code from a web page rendered by the installed browser 210, and the guest browser module 310 then makes HTTP requests to web servers utilizing XMLHTTP or XMLHTTPREQUEST methods and properties. The guest browser module 310 receives the web server response and then may have other functional modules process the response, as described above. Generally, as long as an installed web browser 210 supports the XMLHTTP or XMLHTTPREQUEST object, the offered functionality of the guest browser environment is assured of working with an installed web browser 210. This is an advantage over having to solve the coding complexities involved in writing applications directed toward particular operating systems.

Note that XMLHTTPREQUEST or XMLHTTP is a JavaScript object that is supplied through standard browser implementations, including current browsers Internet Explorer®, Mozilla®, and Safari®, among others. Although some conventional installable plug-ins are not available on all browser platforms, such as UNIX-based platforms, virtual modules of the present disclosure may be implemented on any installed browser that supports JavaScript.

Figure 4:
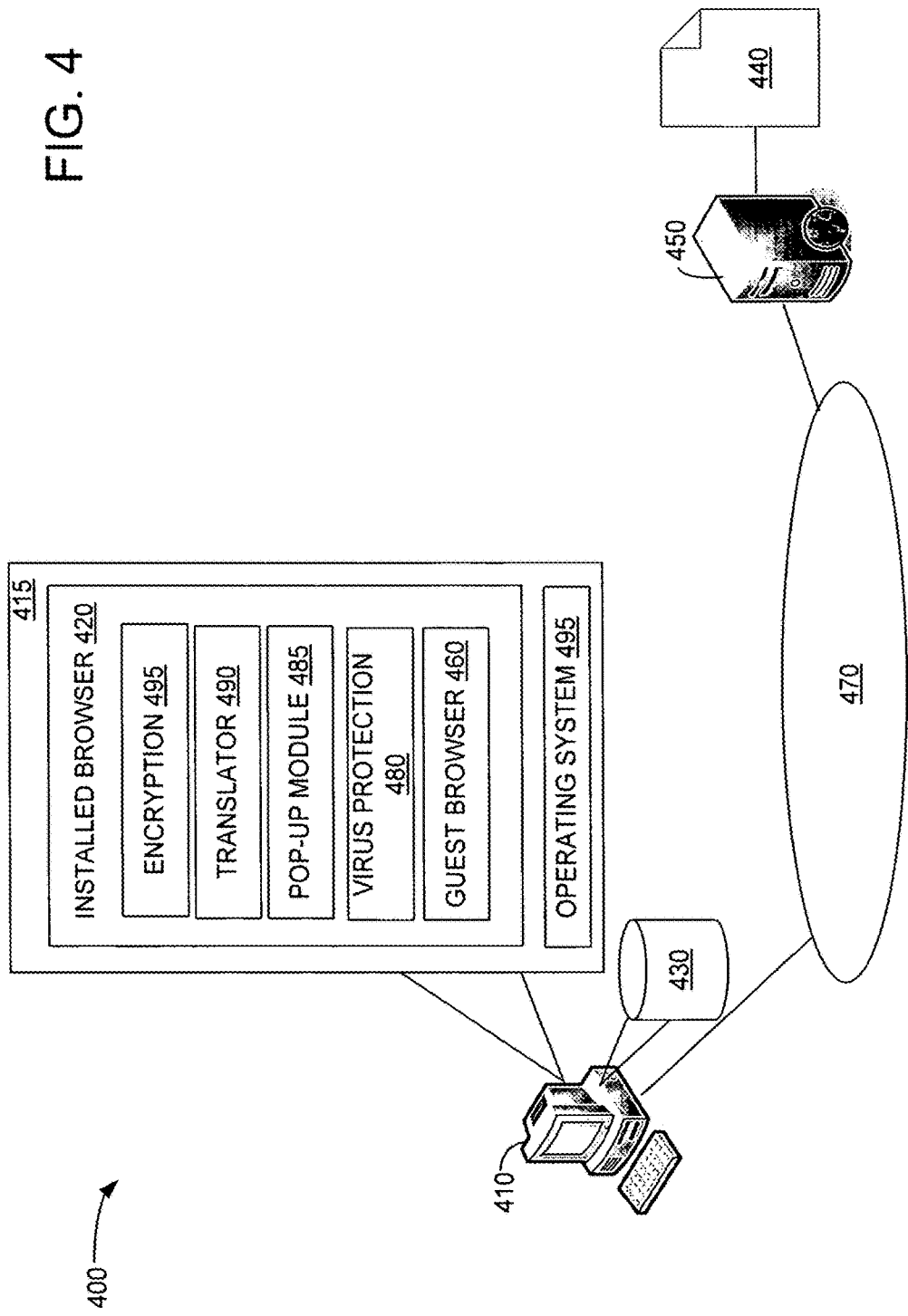
FIG. 4 is a block diagram of various components of one embodiment of a guest browsing system of the present disclosure.

Referring now to FIG. 4, functionality of various components of one embodiment of a guest browsing system 400 is described. As represented in FIG. 4, during operation of the guest browser system 400, a user of a client computer 410 activates an installed web browser application 420 using, for example, a mouse control. The installed browser 420 may be stored on the hard drive 430 of the client computer 410. For example, the installed browser 420 can be the Netscape Navigator®, Microsoft Internet Explorer®, Mozilla Firefox®, etc. The installed browser 420 is used for locating and requesting web pages, such as page 440, maintained at web server 450. The web page 440 is identified by its unique addresses known as Universal Resource Locators (URL), for example, "www.portal.com/user/my-home-page.html."

The server 450 executes web server software to deliver web pages to client computers and devices using the HyperText Transport Protocol (HTTP). For example, using the browser 420, the user of the client 410 can access the page 440 by specifying the URL of the page 440 in a request message such as "www.portal.com/user/my-home-page.html." In response, the server 450 delivers the page 440 to the client 410. Once the page 440 arrives at the client 410, it can be viewed on a display terminal of client device using the installed browser 420.

In one embodiment, the web page 440 includes JavaScript code with an embedded tag that specifies parameters for a guest browser module 460. The guest browser module 460 is a program that provides browsing functionality. The guest browser module 460 can be retrieved dynamically by the client computer 410 via the network 470 (e.g., a number of computers connected together to share information and hardware, including wireless and wired communication lines, and may also include, but is not limited to, a network of networks, such as the Internet) and stored in the memory 415 of the client device 410. The guest browser module 460 is executed from within the application environment of the installed browser 420. Software in the memory 415 also includes a suitable operating system (O/S) 495. The operating system 495 controls the execution of other computer programs, such as the installed web browser 420, and provides scheduling, input-output control, file and data management, memory management, and communication control and related services.

Advantageously, the guest browser 460 may offer browsing functionality that is not evident in the installed browser application 420 itself. In one embodiment, the guest browser module 460 is a platform-independent program that is temporarily loaded along with the page 440. The code of the guest browser module 460 is subsequently discarded with the page 440.

In one embodiment, the tag specifying the guest browser module 460 includes fields that may specify various parameters, including the alignment and dimensions of the display "window" within which the graphic user interface (GUI) of the guest browser module 460 is to operate and a location where the code for the guest browser module 460 is stored on the network 470. The location can be any computer accessible via the network 470. The tag specifying the guest browser module 460 or another tag within the page 440 may also specify a user's or a network administrator's preference on what other modules that are preferred to be dynamically loaded in a similar manner as the guest browser module 460.

As an advantage, the user of the client computer 410 does not need any special software other than a standard web browser 420 to operate the guest browser 460. All processing takes place within the application environment of the installed browser 420 or at various web servers. To enable the guest browser module 460, the web browser 420 only needs to locate any web page 440 that is enabled with code for the guest browser module 460, as described herein.

Additionally, other module components may also be loaded in a similar fashion as the guest browser module 460. In accordance with the present disclosure, it is contemplated that additional modules may be loaded to work in concert with operations of the guest browser module 460. Similar to the guest browser module 460, such modules may be loaded temporarily and executed upon receipt by the installed web browser 420. Such modules include modules for virus protection 480, blocking pop-up advertisements 485, translations of new file standards 490, encryption modules 495, etc., as represented in FIG. 4 and discussed further below.

Figure 5:
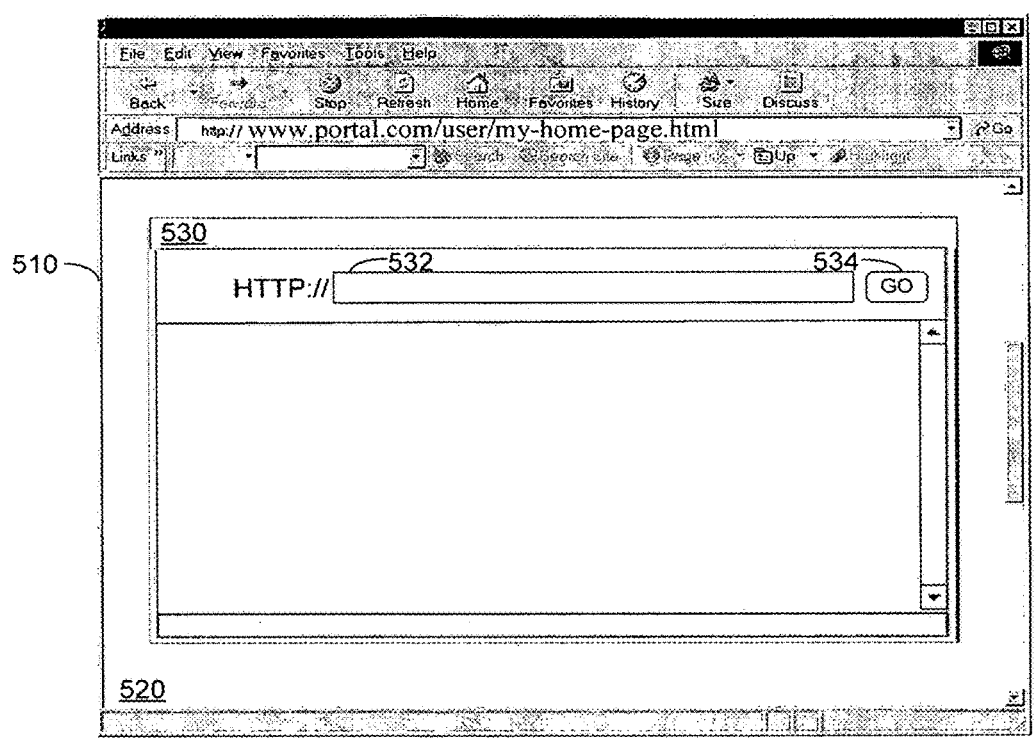
FIGS. 5-7 are diagrams of exemplary graphical interfaces utilized in the guest browser system of FIG. 4.
Figure 6:
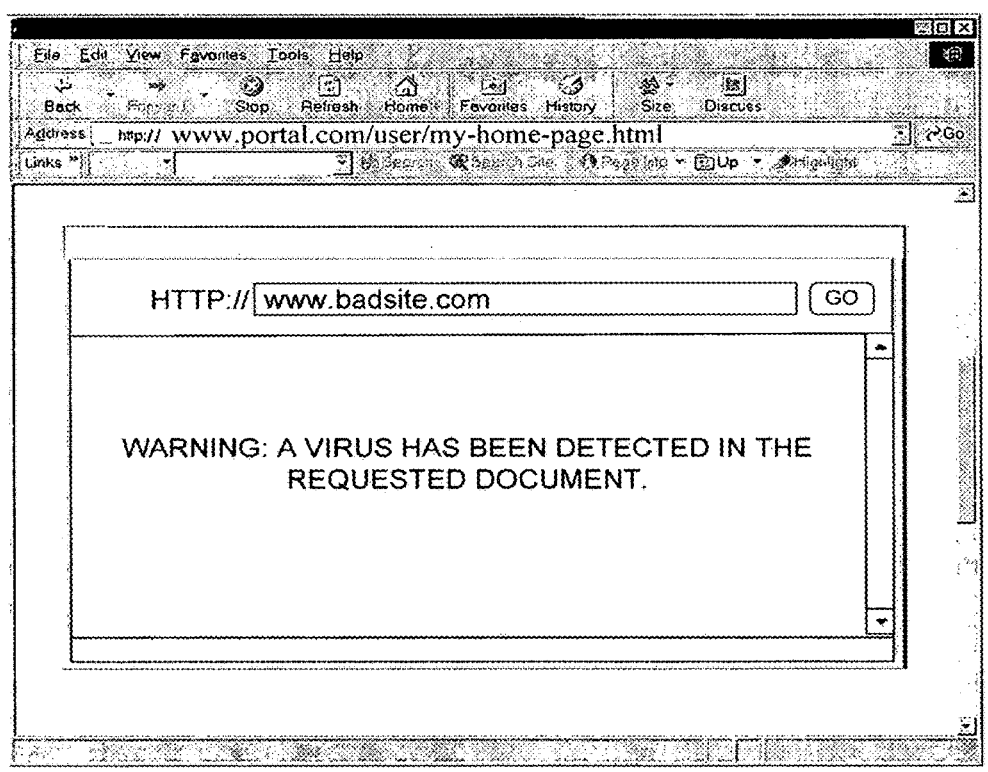
Figure 7:
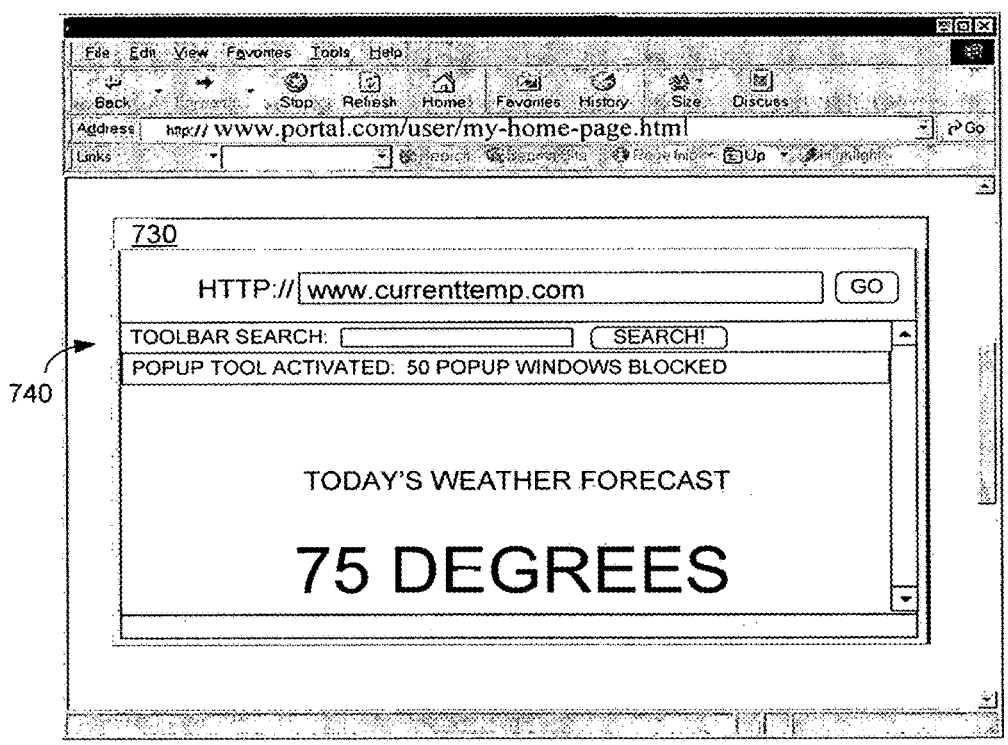

Next, FIGS. 5-7 help describe a sample session utilizing a guest browser system 400, in one embodiment. Within the context of this example, it is assumed that an organizational network provides its users a portal page as a homepage for each user's installed web browser application 420 utilized on a client device 410.

Upon launch of the installed web browser application, a web browser opens a window 510 and retrieves a web page 520 to the portal site (at address www.portal.com/user/my-home-page.html), as shown in FIG. 5. The web page 520 contains JavaScript that constructs a guest browser module. From a cookie that is presented by the user or some other mechanism, components preferred by the user may be retrieved from a virtual library at the portal site and downloaded by the installed web application 420. Therefore, in response to retrieving and displaying the portal page 520, the portal page 520 causes the guest browser module to be retrieved along with other preferred components, such as virus protection module 480 (with current virus definitions), pop-up blocking module 485, etc.

The guest browser interface 530 within the retrieved portal page 520 may resemble a standard browser interface and contain an address bar 532. Therefore, if a user would like to go to a particular web site, the user may enter the address for the web site in the address bar 532 of the guest browser interface 530 and then "enter" a command (e.g., via a keyboard stroke, mouse click, etc.) so that the guest browser accepts the entered address. In the representation of FIG. 2, a user may select the GO button 534.

In one embodiment, the web request is examined by the pop-up blocking module logic to determine if the URL address is a valid and authorized web site. If the web site is not valid, the request does not leave the installed web application 420. Accordingly, in some embodiments, virtual modules may be loaded by the web page 520 in the guest browser environment to perform validation of a requested web page. For example, if a pop-up blocking module 485 detects a markup in an HTML web page that contains a metarefresh instruction for opening up a new web page to a known malicious or nuisance web site, the pop-up blocking module 485 may ignore the instruction.

As previously mentioned, virtual plug-in modules may be loaded from instructions on the web page 520 to provide extended functionality, such as providing support for a new file or data standard, such as standard vector graphics (SVG). For example, this type of module may identify XML code directed towards the SVG standard and then translate the code into drawing stroke commands understood by and passed to the installed web browser 420 for presentation.

In one embodiment, the guest browser system 400 employs a technology generally referred as AJAX. AJAX and similar technology allows the JavaScript within a web page loaded by a web browser to make a call out and get data to use in a given page without having to transition to another page.

In one embodiment employing AJAX technology, the installed web browser 420 creates the guest browser module 460 utilizing an XMLHTTPREQUEST object. The XMLHTTPREQUEST object retrieves content from a web server 450 instead of utilizing the normal flow, as represented in FIG. 2. As previously referenced in FIG. 3, the virus protection module 480 examines the content retrieved by the object before the content is passed to the presentation engine of the installed web browser 420. If the virus protection software module 480 detects a known virus or other potentially malicious code or object, the virus protection module 480 may remove the offending object or not allow the content to be presented for display. Further, the virus protection module 480 may pass a notification message to be displayed as content by the installed web browser 420, as generally shown in FIG. 6.

Other loaded and virtual modules may also interact with content retrieved by the guest browser module 460. For example, a pop-up blocking module 485 may examine content to determine whether there are any type of objects or codes that may trigger pop-up advertisements and in response, remove such references.

Since the guest browser module 460 is pulling content from the network 470, the entire content of the page 520 is not necessarily updated as the module 460 is updating particular content. However, the retrieved content is still subject to virtual plug-ins and modules loaded on demand and displayed through the context of the guest browser 460 as instructed by the web page 520 being displayed.

As previously discussed, one beneficial use of the guest browser 460 is that virtual plug-in modules, such as pop-up blocking modules, virus protection modules, and toolbar modules, may be loaded on any client device at startup of a web browser with the newest version of the plug-in being fairly assured of being loaded on the client machine. This preference information may be maintained on the web server 470 that also maintains a web page 520 used to build the guest browser. Further, on any client machine, a user may be assured of having his or her preferred plug-ins or modules to be loaded. In one embodiment, a guest browser interface 730 may indicate which modules are currently loaded, as shown in FIG. 7 by pointer 740.

Consider that in one sample scenario, a user may approach a kiosk that is running an installed browser 420 and direct the browser 420 to his or her personal portal page 520 that is configured to act as a guest browser 460 and has the appropriate code to launch and build the guest browser interface and preferred plug-ins or modules. Therefore, upon loading the portal page 520 on the installed browser 420 of the kiosk, the user has his or her desired browsing environment and also has a high level of trust with the unknown browser 420 of the kiosk because it is now running all of the user's preferred software, although the user did not have to install any components with the operating system environment that the web browser 420 is running in (within the kiosk).

An additional beneficial use of this system is to construct a protected point tunnel in an installed web browser 420 using the guest browser environment. For example, within an organizational network, such as a corporate network, users may now be allowed to visit outside mail services, such as Yahoo® Mail or Hotmail®, since the virus protection module is in place to intercept any malicious mail before it has a chance to infect the operating system 495 of the client system and other client systems. This may alleviate concerns with contractors within a corporation having to access outside their company e-mail when the company of the contractors does not recognize a virtual private network (VPN) utilized by the corporation. Further, in some embodiments, additional functionality offered by the guest browser environment is a virtual and dynamically loaded VPN solution that persists within the installed web browser instance, where the algorithm for the VPN solution is implemented by the web page 520 or site implementing the guest browser logic.

In an additional embodiment, virtual proxy server functionality may be employed by the code implementing the guest browser module. For example, in many corporate environments, installed web browsers 420 of client machines are configured to send network requests through a proxy server. In accordance with an embodiment of the present disclosure, this type of setting may be established within the guest browser environment. For example, a virtual proxy object may be loaded by an installed web browser 420 that works in concert with the guest browser 460 to check a web request against authorized list of web sites or non-authorized list of web sites to determine whether the web request is authorized. If the web request is not authorized, then the guest browser module 460 does not send a request for content from the requested web site.

With this type of administrative control, network security settings do not have to be set at client stations and new software does not have to be pushed to client desktops. Rather, new management controls may be initiated on a demand basis without interrupting the workflow of users. Similar functionality may also be offered in a commercial environment.

In an additional context, one embodiment of the guest browser system 400 is capable of making secure calls from an insecure web page or vice versa, either in conjunction with a virtual proxy server or a virtual plug-in module. Consider that in one example, a web site may in response to receiving a username and password provide a cookie which has a key that is used to maintain communications with the web site. During communications, the cookie is repeatedly provided back to the web site as proof of authorization. Further, a virtual plug-in module may be employed that changes the key every 60 seconds, where the current key is required for repeated communication with the web-site.

In an additional embodiment, the guest browser logic may simulate another web browser platform. For example, as a testing environment, the guest browser module may identify itself (e.g., modify the header elements sent to the server) as a different browser platform than the installed browser platform or identify itself as a platform for an operating system that is different than the installed operating system, so that browser compatibility may be tested. Accordingly, in one embodiment, HTML code may be manipulated by the guest browser logic before it is provided to the installed web browser 420 for presentation. Further, the guest browser logic may simulate known bugs or overcome native issues with a "virtual patch." For example, if it is known that a particular version of Internet Explorer® does not render a particular object that has a coding error, the coding error may be fixed on the fly by the guest browser logic. As a result, only properly formatted code is actually passed out to the installed web browser 420 for presentation.

Another common problem in testing is that different browser versions do not operate well with other browser versions that are installed on the same operating system at the same time. Therefore, different browser versions may be simulated using one guest browser implementation, which is beneficial and may be referred to as a type of virtual canonicalization.

Since not all browsers and not all servers necessarily support compression, another beneficial use of one embodiment of the guest browser environment is to send a reduced instruction request back and forth between a server 470 and the guest browser module 460. Further, in some embodiments, the compression model utilized by the guest browser is a model not understood by the installed web browser 420 itself. Therefore, as part of an exchange with a web site, the guest browser module 460 may identify that it has the feature of supporting a compression algorithm. Accordingly, this feature of making a compressed request from an installed browser 420 that does not support compression may be utilized without having to install the feature with the operating system 495 or modifying the base browser 420.

Also, in some embodiments, guest browser logic may employ an algorithm that delays picture and image loads until after style sheets and basic text is downloaded to give an appearance of providing a speed boost by reordering the order at which network content is received and presented. Further, in some embodiments, a network policy (such as a corporate policy) may be instituted via guest browser logic that modifies the download rate for visits to external sites such that users of the guest browser have to comply with a particular download rate set by organizational network rules.

New and interesting extensions may also be made to HTML code via one embodiment of the guest browser system of the present disclosure. In one application, e-mail address information may be hidden from view of installed web browsers but be made accessible to guest browsers. For example, in one implementation, a markup may be created to identify an encryption language that is used to encrypt e-mail addresses within a web page. Therefore, Internet robots and spiders that look for e-mail addresses from Internet content will be unable to recognize e-mail addresses that are encrypted. However, to a guest browser implementation, the encrypted e-mail address is recognized, decrypted, and displayed to a user, since the guest browser logic knows how to do the decryption. As such, the decryption process is performed at display time by the guest browser module 460.

Figure 8:
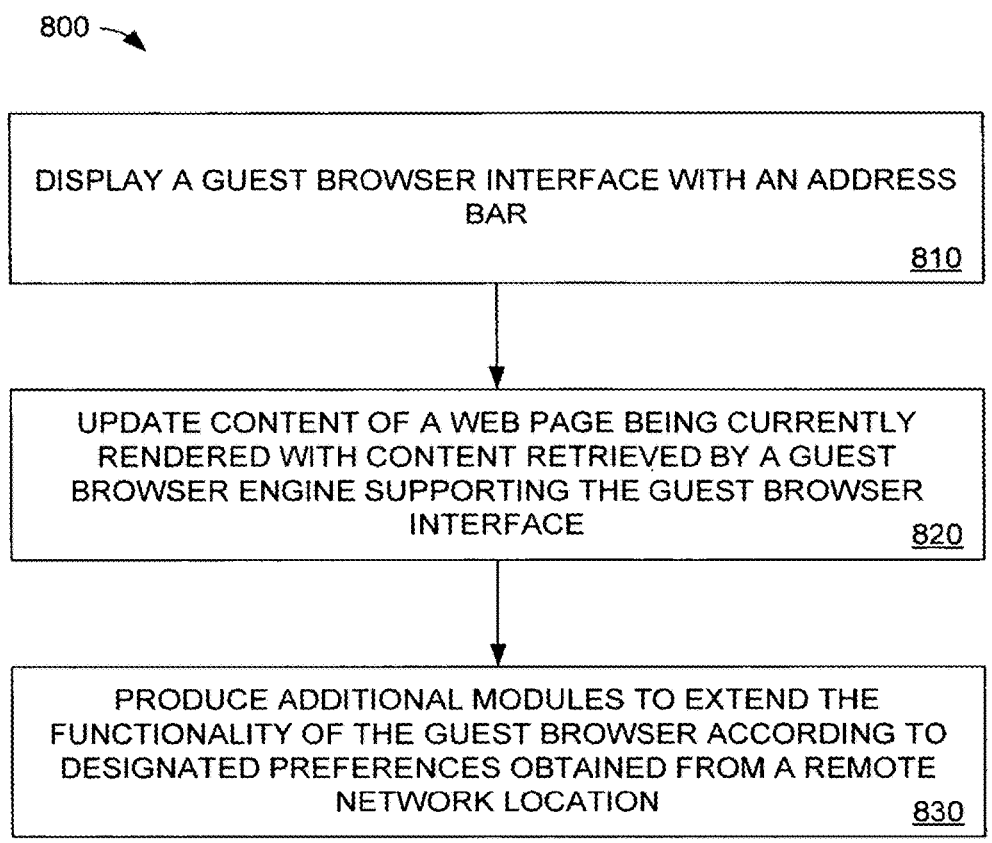
FIGS. 8-9 are flow chart diagrams describing embodiments of methods utilized in implementing one embodiment of a guest browser system of the present disclosure.

Referring now to FIG. 8, a flow chart describing one embodiment of a method 800 for implementing a guest browser is shown. The method 800 starts at block 810 where a guest browser interface is displayed with an address bar. The guest browser interface is displayed within an interface of an installed web browser and is built from code provided by a web page currently being rendered by the installed web browser. The method 800 further includes the step of updating (820) content of the web page being currently rendered with content retrieved by a guest browser engine supporting the guest browser interface. The guest browser engine retrieves content corresponding to a requested web page at a network address inputted into the address bar by a user. Additional modules may also be produced (830) to extend the functionality of the guest browser according to designated preferences obtained from a remote network location. The additional modules may be produced or instantiated based upon code provided by the web page being currently rendered by the installed web browser.

Figure 9:
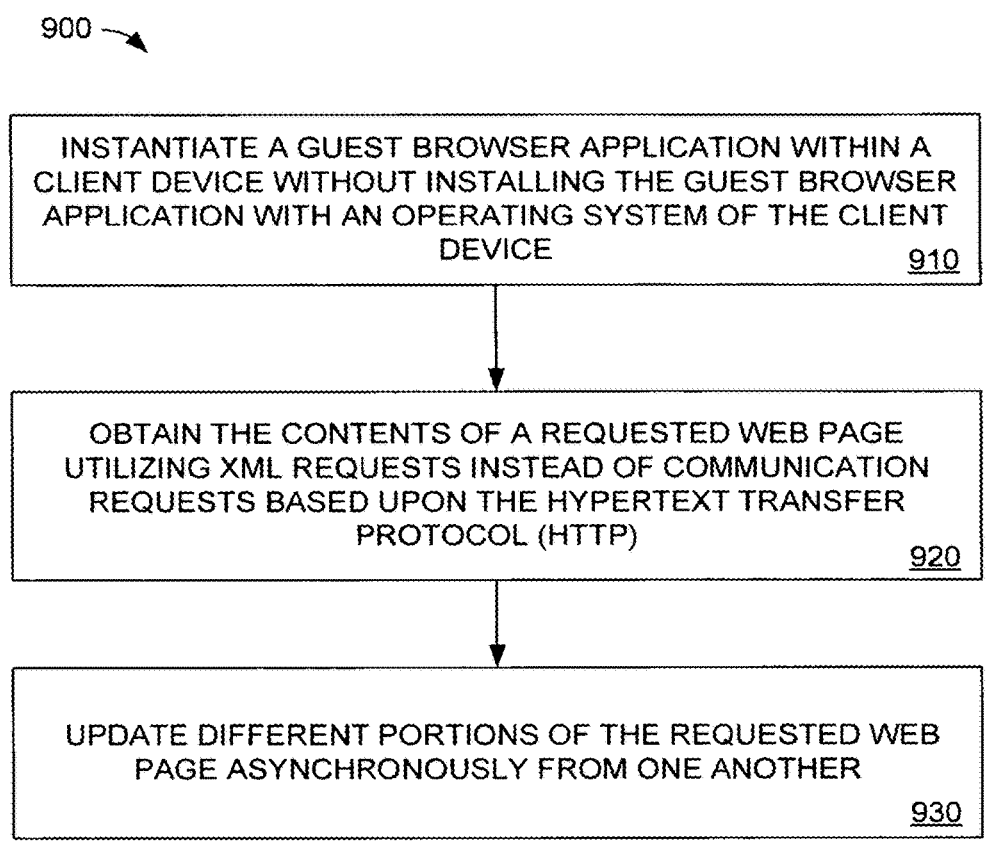

Referring next to FIG. 9, a flow chart describing another embodiment of a method 900 for implementing a guest browser is shown. The method 900 starts at block 910 where a guest browser application is instantiated within a client device without installing the guest browser application with an operating system of the client device. Further, the guest browser application is configured to obtain (920) the contents of a requested web page utilizing XML requests instead of communication requests based upon the hypertext transfer protocol (HTTP). Further, different portions of the requested web page may be updated (930) asynchronously from one another.

Advantageously, with AJAX and related technologies, a guest browser module 460 is allowed to make server calls outside a normal page refresh cycle, and the data that is returned can be defined in an XML structure that may be interpreted according to logic of the guest browser environment. Generally, the guest browser engine allows a user's interaction with guest browser interface to happen asynchronously and independent of communication with the server. As a result, a user does not have to stare at a blank browser window waiting for a response from a web server 450, since a user action that normally would generate an HTTP request takes the form of a JavaScript call to the guest browser module 460 instead.

The end result is that a guest browser 460 can have capabilities greater than or less than the installed browser 420 it is running in. Further, one is able to submit an asynchronous request from the guest browser 460 without the installed web browser 420 having to go back to the server 450 for every request to refresh a new page of content. Thus, the guest browser 460 can make asynchronous calls to a network server and acquire data and the page without doing a page refresh.

Further, consider that one of the complaints with general browser functionality is that a user has to wait for a whole web page to be painted or rendered by the web browser. However, with an embodiment of the guest browser environment, the guest browser environment may be constructed so that there is more of a persistent type of functionality on the desktop, yet particular components of a web page may be protected and may pull data back from other network systems without having to refresh all the content of the whole page each time.

When the guest browser module 460 and other modules/components are implemented in software, as is shown in FIG. 4, it should be noted that the guest browser module 460 can be stored on any computer readable medium for use by or in connection with any computer related system or method. In the context of this document, a computer readable medium is an electronic, magnetic, optical, or other physical device or means that can contain or store a computer program for use by or in connection with a computer related system or method.

The guest browser module 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. For example, one embodiment of a guest browser system provides a virus protection module that feeds data received from the Internet to a centralized and externalized virus protection system that inspects the data before authorizing its presentation on a client system. All such modifications and variations are intended to be included herein within the scope of this disclosure.

What is claimed is:

1. A system comprising:
    a processor; and
    memory that stores an installed web browser application and instructions that, when executed by the processor, cause the processor to perform operations comprising
        retrieving, via the installed web browser application, a web page comprising code for a guest browser module,
        displaying, via an installed web browser interface of the installed web browser application, the web page,
        executing, within an application environment of the installed web browser application, the code for the guest browser module to cause the installed web browser interface of the installed web browser application to display, within the web page, a guest browser interface of the guest browser module, wherein the guest browser module provides browsing functionality via the guest browser interface that is different from the browsing functionality provided by the installed web browser application via the installed web browser interface, and
        discarding the code for the guest browser module when the web page is discarded.

2. The system of claim 1, wherein the installed web browser interface comprises a first address bar and a first display section and the guest browser interface comprises a second address bar and a second display section.

3. The system of claim 1, wherein the web page further comprises code associated with a plug-in module that works in concert with the guest browser module, and wherein the code associated with the plug-in module is executed, within the application environment of the installed web browser application, along with the code for the guest browser module.

4. The system of claim 1, wherein the operations further comprise storing, in a cache associated with the installed web browser application, the code for the guest browser module.

5. The system of claim 3, wherein the plug-in module comprises at least one of a virtual pop-up blocking module, a virtual toolbar module, or a virtual virus protection module.

6. The system of claim 3, wherein the plug-in module extends the browsing functionality provided by the guest browser module beyond the browsing functionality of the installed web browser application such that the browsing functionality provided by the guest browser module is different from the browsing functionality provided by the installed web browser application.

7. The system of claim 3, wherein the plug-in module is specified by preference information associated with the web page.

8. A computer-readable storage device storing an installed web browser application and instructions that, when executed by a processor, cause the processor to perform operations comprising:
    retrieving, via the installed web browser application, a web page comprising code for a guest browser module;

displaying, via an installed web browser interface of the installed web browser application, the web page;

executing, within an application environment of the installed web browser application, the for the guest browser module to cause the installed web browser interface of the installed web browser application to display, within the web page, a guest browser interface of the guest browser module, wherein the guest browser module provides browsing functionality via the guest browser interface that is different from the browsing functionality provided by the installed web browser application via the installed web browser interface; and discarding the code for the guest browser module when the web page is discarded.

9. The computer-readable storage device of claim 8, wherein the installed web browser interface comprises a first address bar and a first display section and the guest browser interface comprises a second address bar and a second display section.

10. The computer-readable storage device of claim 8, wherein the web page further comprises code associated with a plug-in module that works in concert with the guest browser module, and wherein the code associated with the plug-in module is executed, within the application environment of the installed web browser application, along with the code for the guest browser module.

11. The computer-readable storage device of claim 8, wherein the operations further comprise storing, in a cache associated with the installed web browser application, the code for the guest browser module.

12. The computer-readable storage device of claim 10, wherein the plug-in module comprises at least one of a virtual pop-up blocking module, a virtual toolbar module, or a virtual virus protection module.

13. The computer-readable storage device of claim 10, wherein the plug-in module extends the browsing functionality provided by the guest browser module beyond the browsing functionality of the installed web browser application such that the browsing functionality provided by the guest browser module is different from the browsing functionality provided by the installed web browser application.

14. The computer-readable storage device of claim 10, wherein the plug-in module is specified by preference information associated with the web page.

15. A computer-readable storage device storing an installed web browser application and instructions that, when executed by a processor, cause the processor to perform operations comprising:

receiving, via an installed web browser interface of the installed web browser application, a request for a web page, the web page comprising code for a guest browser module;

retrieving, via the installed web browser application, the web page comprising the code for the guest browser module;

displaying, via the installed web browser interface of the installed web browser application, the web page;

executing, within an application environment of the installed web browser application, the code for the guest browser module to cause the installed web browser interface of the installed web browser application to display, within the web page, a guest browser interface of the guest browser module, wherein the guest browser module provides browsing functionality via the guest browser interface that is different from the browsing functionality provided by the installed web browser application via the installed web browser interface; and discarding the code for the guest browser module when the web page is discarded.

16. The computer-readable storage device of claim 15, wherein the installed web browser interface comprises a first address bar and a first display section and the guest browser interface comprises a second address bar and a second display section.

17. The computer-readable storage device of claim 15, wherein the web page further comprises code associated with a plug-in module that works in concert with the guest browser module, and wherein the code associated with the plug-in module is executed, within the application environment of the installed web browser application, along with the code for the guest browser module.

18. The computer-readable storage device of claim 15, wherein the operations further comprise storing, in a cache associated with the installed web browser application, the code for the guest browser module.

19. The computer-readable storage device of claim 17, wherein the plug-in module comprises at least one of a virtual pop-up blocking module, a virtual toolbar module, or a virtual virus protection module.

20. The computer-readable storage device of claim 17, wherein the plug-in module extends the browsing functionality provided by the guest browser module beyond the browsing functionality of the installed web browser application such that the browsing functionality provided by the guest browser module is different from the browsing functionality provided by the installed web browser application.

* * * * *